J. K. O'Neil,
Wash-Board,
N° 22,667.   Patented Jan. 18, 1859
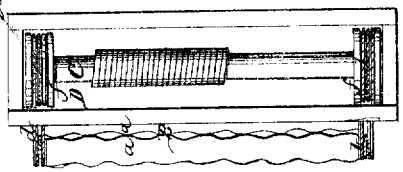
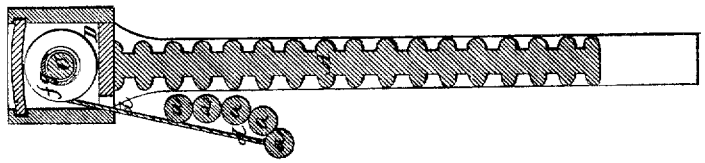
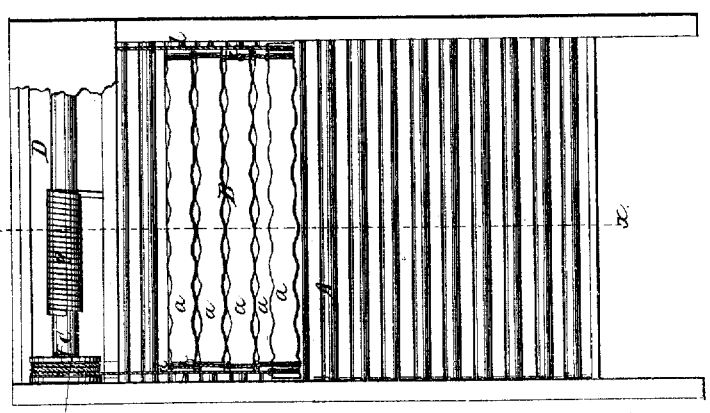
Witnesses   Inventor
J. S. Brown   John K. O'Neil
R. F. Osgood

UNITED STATES PATENT OFFICE.

JOHN K. O'NEIL, OF KINGSTON, NEW YORK.

IMPROVED WASH-BOARD.

Specification forming part of Letters Patent No. 22,667, dated January 18, 1859.

*To all whom it may concern:*

Be it known that I, JOHN K. O'NEIL, of Kingston, in the county of Ulster and State of New York, have invented a new and Improved Combined Flexible Rubber and Wash-Board; and I do hereby declare that the following is a full and exact description thereof, reference being had to the accompanying drawings, making part of this specification.

Figure 1 is a plan of the utensil; Fig. 2, a vertical section thereof in the plane indicated by the line $x\ x$, Fig. 1; Fig. 3, a top or end view thereof.

Like letters designate corresponding parts in all the figures.

The wash-board A may be of any ordinary or suitable construction; and my improvement consists in an improved flexible rubber, B, combined in an improved manner with the wash-board. This rubber is intended to fulfill all the offices of the human hands in washing, and even to have a superiority over the hands in expedition and efficiency, while the hands are by it perfectly protected from injurious and painful rubbing and wearing.

The preferable mode of constructing the flexible rubber is with a set of small rods or rollers, $a\ a\ a$, &c., of suitable size, and connected at their ends with cords $b\ b$, substantially as represented in the drawings, or in any other equivalent manner, so that together they will be suitably flexible and yielding. It may be so arranged that the rods or rollers will turn freely on their axes or not, as may be desired. The rods or rollers may be formed in beads or bosses, as shown, or in any equivalent way. To the lower rod or edge of the rubber cords $d\ d$ are attached, substantially as shown, and extend thence upward into an inclosed space, D, at the top of the wash-board, where they are wound around pulleys $f\ f$ on a shaft, C, which is provided with a coiled spring, $g$, for the purpose of keeping the said cords $d\ d$ wound up around their respective pulleys. This arrangement keeps the rubber drawn up to the top of the wash-board, and when the rubber is forced down in rubbing the clothes it serves to draw it up again, and thus assist the muscles of the washer-woman and relieve them of much labor, since it is much more fatiguing to exert the muscles in rising than in pressing downward. The force of the spring $g$, or its equivalent, may be greater or less, as desired. Any equivalent mode of producing the elastic return of the rubber to the top of the wash-board may be employed, as I do not confine myself to the particular device represented.

The action of the rubber as thus constructed is simple and obvious: The articles to be washed are placed on the wash-board beneath the rubber, which is grasped by the hand at the lower edge, together with the articles, and rubbed up and down on the wash-board with any degree of pressure, the rubber performing the part of the hands. At the same time the surface of the wash-board is free and flush, so that the articles may be moved about and controlled with the utmost freedom. The rubber is naturally grasped so that the hands need not at all come in contact with the wash-board.

Only one rubber is represented on the wash-board; but I contemplating using two on one wash-board, when desirable, one for each hand, so that both hands may be employed at the same time in rubbing.

Besides the other advantages of the above invention, it is found that it works less injury to the fabrics than the hands, because it does not pull upon the material, thus not tending to tear it. It is also capable of very great lightness and delicacy in rubbing delicate articles.

What I claim as my invention, and desire to secure by Letters Patent, is—

The flexible rubber B, constructed as described, and combined with the wash-board A, so that its upward movement shall be assisted by a spring or its equivalent arranged substantially as specified.

JOHN K. O'NEIL.

Witnesses:
R. F. OSGOOD,
J. S. BROWN.